United States Patent
Krauss

(10) Patent No.: US 8,356,284 B2
(45) Date of Patent: Jan. 15, 2013

(54) THREADING MODEL ANALYSIS SYSTEM AND METHOD

(75) Inventor: Kirk J. Krauss, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 1783 days.

(21) Appl. No.: 11/617,594

(22) Filed: Dec. 28, 2006

(65) Prior Publication Data

US 2008/0163174 A1 Jul. 3, 2008

(51) Int. Cl.
*G06F 9/44* (2006.01)
(52) U.S. Cl. ............... 717/127; 717/131; 718/102
(58) Field of Classification Search .................. None
See application file for complete search history.

(56) References Cited

U.S. PATENT DOCUMENTS

| | | | | |
|---|---|---|---|---|
| 5,247,675 A * | 9/1993 | Farrell et al. | .................. | 718/103 |
| 6,173,442 B1 * | 1/2001 | Agesen et al. | ................. | 717/141 |
| 6,243,788 B1 | 6/2001 | Franke et al. | | |
| 6,289,369 B1 | 9/2001 | Sundaresan | | |
| 6,427,161 B1 * | 7/2002 | LiVecchi | ....................... | 718/102 |
| 6,542,920 B1 * | 4/2003 | Belkin et al. | .................. | 718/104 |
| 6,580,715 B1 * | 6/2003 | Bare | ............................. | 370/396 |
| 6,633,897 B1 | 10/2003 | Browning et al. | | |
| 6,721,775 B1 | 4/2004 | Fagen et al. | | |
| 6,728,959 B1 | 4/2004 | Merkey | | |
| 6,742,086 B1 | 5/2004 | Cotugno et al. | | |
| 6,789,253 B1 | 9/2004 | Streich et al. | | |
| 6,961,925 B2 * | 11/2005 | Callahan et al. | ............... | 717/128 |
| 7,069,555 B1 | 6/2006 | Tzen | | |
| 7,137,117 B2 * | 11/2006 | Ginsberg | ....................... | 718/102 |
| 7,945,657 B1 * | 5/2011 | McDougall et al. | .......... | 709/224 |
| 7,987,452 B2 * | 7/2011 | Kronlund et al. | ............. | 717/127 |
| 2002/0129339 A1 * | 9/2002 | Callahan et al. | ............... | 717/127 |
| 2002/0170038 A1 | 11/2002 | Yeh et al. | | |
| 2002/0184290 A1 | 12/2002 | Olszewski et al. | | |
| 2003/0065704 A1 * | 4/2003 | Buch | ............................. | 709/107 |
| 2004/0117796 A1 * | 6/2004 | Dichter | ......................... | 718/107 |
| 2004/0139433 A1 | 7/2004 | Blythe et al. | | |
| 2004/0139434 A1 | 7/2004 | Blythe et al. | | |
| 2004/0199919 A1 | 10/2004 | Tovinkere | | |
| 2006/0136919 A1 * | 6/2006 | Aingaran et al. | ............. | 718/100 |
| 2007/0169002 A1 * | 7/2007 | Kronlund et al. | ............. | 717/130 |
| 2008/0109817 A1 * | 5/2008 | Nakamura | ..................... | 718/105 |
| 2010/0318852 A1 * | 12/2010 | Zheng et al. | ..................... | 714/37 |

OTHER PUBLICATIONS

Cao, et al., "A Study of Java Virtual Machine Scalability Issues on SMP Systems", IEEE, pp. 119-128 (2005).

* cited by examiner

*Primary Examiner* — Jason Mitchell
(74) *Attorney, Agent, or Firm* — Holland & Knight LLP; Brian J. Colandreo, Esq.; Jeffrey T. Placker, Esq.

(57) ABSTRACT

A method and computer program product for detecting an attempt by a first thread to engage a synchronization object. A determination is made as to whether an earlier thread has already engaged the synchronization object. In response to determining that the earlier thread has already engaged the synchronization object, a determination is made as to whether the number of threads waiting to engage the synchronization object is greater than a highwater mark.

16 Claims, 8 Drawing Sheets

THREADING MODEL ANALYSIS SYSTEM AND METHOD

TECHNICAL FIELD

This disclosure relates to multiprocessor system analysis and, more particularly, systems and methods that analyze the efficiency of threading models used on such multi-processor systems.

BACKGROUND

There are comparatively few tools that analyze the extent to which software applications utilize multiprocessor systems effectively. Yet if a software applications isn't multiprocessor-exploitive, it may become less competitive (performance-wise), as the popularity of multiprocessor systems increases.

On conventional multiprocessor systems running standard operating systems, multithreaded applications are nominally multiprocessor-exploitive because the threads of the application are assigned to individual processors that can run them concurrently. However, the degree to which a multithreaded program is actually multiprocessor-exploitive may vary depending on the design of the application itself.

Unfortunately, such a multithreaded program may fail when individual threads of the program block one another, thus allowing one or more processors to idle while useful computations could have occurred. Accordingly, a better-designed threading model for such a multithreaded application may prevent this waste of processor time, thus improving the observed performance of the multiprocessor system.

SUMMARY OF DISCLOSURE

In a first implementation of this disclosure, a threading model analysis method includes detecting an attempt by a first thread to engage a synchronization object. A determination is made as to whether an earlier thread has already engaged the synchronization object. In response to determining that the earlier thread has already engaged the synchronization object, a determination is made as to whether the number of threads waiting to engage the synchronization object is greater than a highwater mark.

One or more of the following features may also be included. In response to determining that the number of threads waiting to engage the synchronization object is greater than the highwater mark, the highwater mark may be set equal to the number of threads waiting to engage the synchronization object.

The number of threads waiting to engage the synchronization object may include only the first thread. In response to setting the highwater mark equal to the number of threads waiting to engage the synchronization object, an elapsed time counter indicative of the amount of time that the first thread has been waiting to engage the synchronization object may be started.

In response to determining that the number of threads waiting to engage the synchronization object was not greater than the highwater mark, a determination may be made as to whether any thread, other than the earlier thread, is ready to run. In response to determining that a thread, other than the earlier thread, is ready to run, the highwater mark may be set equal to the number of threads waiting to engage the synchronization object. The highwater mark may have an initial value of zero and may be incremented to match the number of threads waiting to engage the synchronization object.

Disengagement of the synchronization object may be detected. One or more lock contention records associated with the disengaged synchronization object may be identified. The one or more lock contention records may be updated to reflect the disengagement of the synchronization object.

A program termination condition and/or a data request may be detected. A determination may be made as to whether one or more lock contention records exists. At least one of the one or more lock contention records may be reported sorted by elapsed time, level of synchronization object contention, commonality among the resource allocation scenarios, and/or other ordering schemes.

In another implementation of this disclosure, a computer program product includes a computer useable medium having a computer readable program. The computer readable program, when executed on a computer, causes the computer to detect an attempt by a first thread to engage a synchronization object. A determination is made as to whether an earlier thread has already engaged the synchronization object. In response to determining that the earlier thread has already engaged the synchronization object, a determination is made as to whether the number of threads waiting to engage the synchronization object is greater than a highwater mark.

One or more of the following features may also be included. In response to determining that the number of threads waiting to engage the synchronization object is greater than the highwater mark, the highwater mark may be set equal to the number of threads waiting to engage the synchronization object.

The number of threads waiting to engage the synchronization object may include only the first thread. In response to setting the highwater mark equal to the number of threads waiting to engage the synchronization object, an elapsed time counter indicative of the amount of time that the first thread has been waiting to engage the synchronization object may be started.

In response to determining that the number of threads waiting to engage the synchronization object was not greater than the highwater mark, a determination may be made as to whether any thread, other than the earlier thread, is ready to run. In response to determining that a thread, other than the earlier thread, is ready to run, the highwater mark may be set equal to the number of threads waiting to engage the synchronization object. The highwater mark may have an initial value of zero and may be incremented to match the number of threads waiting to engage the synchronization object.

Disengagement of the synchronization object may be detected. One or more lock contention records associated with the disengaged synchronization object may be identified. The one or more lock contention records may be updated to reflect the disengagement of the synchronization object.

A program termination condition and/or a data request may be detected. A determination may be made as to whether one or more lock contention records exists. At least one of the one or more lock contention records may be reported sorted by elapsed time, level of synchronization object contention, commonality among the resource allocation scenarios, and/or other ordering schemes.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
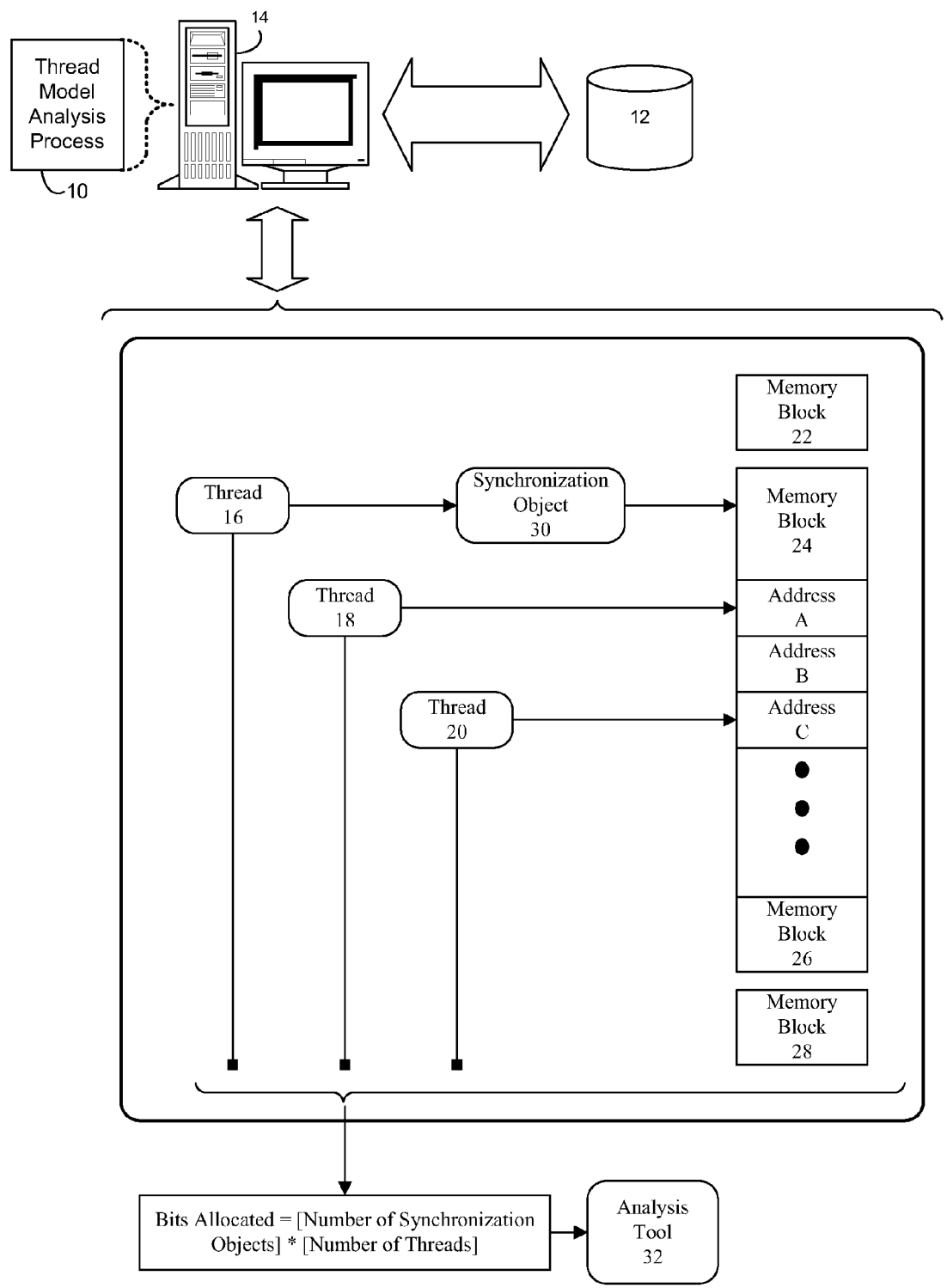
FIG. 1 is a diagrammatic view of a threading model analysis process executed in whole or in part by a computer.

Overview:

As will be discussed below in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks may include, but are not limited to, compact disc-read only memory (CD-ROM), compact disc-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories that may provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Many programming languages, operating systems, and other software development environments support what are known as "threads" of execution. Threads are similar to processes, in that each represents a single sequence of computer program instructions that can be executed in parallel with other sequences of instructions, but a given process may contain multiple threads that run concurrently. Threads are executed in parallel within a computer system using technologies such as time slicing and preemption. In essence, threads provide a mechanism by which a computer program may "split itself" into two or more simultaneously running tasks.

Because threads are capable of operating in parallel, there may be a scenario in which more than one thread tries to access to a given computer resource (e.g., a portion of memory) at the same time. In the typical case, a thread requires constantly unshared access to a portion of memory during the time while a particular set of instructions is executing. That is, the thread reads from and writes to a given portion of memory. During that time, if another thread writes to the same portion of memory, the data may become inaccurate, "clobbered", or otherwise corrupted.

To avoid such a condition, synchronization objects, also referred to as "locks", are usually employed. Examples of synchronization objects may include, but are not limited to, defining a portion of code as a "critical section" that requires the use of a particular application programming interface (API), semaphores, or the like, for accessing the resource. In general, once a synchronization object is engaged by e.g., "Thread A", the synchronization object may prevent e.g., "Thread B" and "Thread C" from also engaging the synchronization object. This causes "Thread B" and "Thread C", which must engage the synchronization object, to block (e.g., wait) until the synchronization object is removed or disengaged by "Thread A".

This disclosure provides a runtime analysis tool (or a portion thereof) for evaluating a computer program under test (i.e., CPUT). During execution of the CPUT, information relating to the use of synchronization objects by various threads may be collected. The synchronization object usage information may be analyzed to identify candidate portions of computer program code (included within the CPUT) that, according to analysis criteria, cause a higher than acceptable number of threads to wait for a given synchronization object. Since threads waiting for synchronization objects may waste significant computing time, bringing such portions of code to the attention of a software developer may aid in the optimization and improvement of CPUT.

The various functions described herein may be implemented within a software analysis tool. In one embodiment, for example, the various functions described herein may be implemented as extensions of one or more members of the Rational PurifyPlus family of software analysis tools that are commercially available from International Business Machines Corporation of Armonk, N.Y. (IBM). PurifyPlus is a family of computer programs that provide runtime analysis functionality to software developers and testers. In general, runtime analysis refers to the practice of analyzing and understanding application behavior using data collected during execution of a CPUT.

The subject matter of this disclosure may include functionality for generating call graphs via runtime analysis. A tool called Quantify, for example, which is a member of the PurifyPlus product family, may produce call graphs for a CPUT. In general, a call graph may refer to a diagram that identifies the functions, methods, and/or modules in a system or computer program and shows which functions, methods, and/or modules invoke one another. A call graph may also be referred to as a call tree or a tier chart.

The various development activities that may be analyzed using PurifyPlus may include, but are not limited to, memory corruption detection and memory profiling in native C/C++ applications, memory profiling in Java and NET managed code applications, performance profiling to identify slow or inefficient portions of code, code coverage analysis, and runtime tracing. PurifyPlus may also perform thread profiling. Thread profiling may entail inspecting and preventing intermittent hangs, data corruption, or performance degradation due to deadlocks, race conditions, and/or thread starvation.

The various functionality disclosed herein is intended to provide a basis for teaching one skilled in the art to better understand the concepts disclosed herein. It should be appreciated, however, that the present disclosure may be implemented as a standalone application, as part of a larger application or in virtually any appropriately detailed structure, computer program, and/or portion thereof.

Referring to FIG. 1, there is shown a thread model analysis process 10 resident on (in whole or in part) and executed by (in whole or in part) analysis computer 12 (e.g., a single server computer, a plurality of server computers, or a general purpose computer, for example). As will be discussed below in greater detail, thread model analysis process 10 may analyze a threading model used in a CPUT to identify deficiencies in the threading model that may lead to inefficient computation usage. Thread model analysis process 10, which may be included within the above-described software analysis tools, may include several sub-processes, each of which will be discussed below in greater detail.

The instruction sets and subroutines of thread model analysis process 10, which may be stored on a storage device 12 coupled to computer 14, may be executed by one or more processors (not shown) and one or more memory architectures (not shown) incorporated into computer 14. Storage device 12 may include, but is not limited to, a hard disk drive, a tape drive, an optical drive, a RAID array, a random access memory (RAM), or a read-only memory (ROM).

FIG. 1 is illustrative of the execution of the CPUT, which may include a plurality of threads (e.g., threads 16, 18, 20). During execution of the CPUT, threads 16, 18, 20 may access memory blocks 22, 24, 26, 28. Access to memory blocks 22, 24, 26, 28 may be gained through various functions (e.g., "malloc" in the C programming language) or via other heap allocation mechanisms, and may be accessed through memory read and write operations such as register load and store instructions.

As shown, thread 16 has engaged synchronization object 30 to protect memory block 24. Analysis tool 32, such as one of the variety already described herein, may evaluate the execution of the CPUT, and e.g., note which threads have accessed which memory blocks and/or addresses within the memory blocks. Further, analysis tool 32 may determine the time that each portion/address of a memory block is accessed by each thread, as well as whether a synchronization mechanism was engaged at that time. If such a synchronization mechanism was engaged, information such as the resource(s) that the synchronization object was protecting may also be recorded.

In order to track the different accesses of memory blocks 22, 24, 26, 28 by threads 16, 18, 20, analysis tool 32 may allocate a particular portion of memory referred to as state memory. The size of the state memory may be dictated by one or more parameters. In one embodiment, for example, the number of state bits allocated for tracking purposes may be calculated as follows: (state bits allocated)=(# of synchronization objects)×(# of threads). As memory block addresses are accessed by threads, bits in the state memory may be allocated and set accordingly.

It should be appreciated, however, that other tracking and memory allocation mechanisms may be used for tracking thread activity, synchronization object usage, resources protected by synchronization objects, and the timing of such activities. Accordingly, the present disclosure is not intended to be limited to the use of one particular technique or data structure. For example, lists and any other suitable data structures may also be used.

For example, the state memory may indicate that thread 16 has engaged synchronization object 30 to protect memory block 24. During the time that synchronization object 30 was engaged by thread 16, thread 18 and thread 20 may have waited for synchronization object 30, though neither of threads 18, 20 ever accessed memory block 24 during that time within the run of CPUT. Alternatively, in a more rigorous embodiment in which each individual memory address is associated with its own state bit tracking, the state memory may further indicate the addresses (within a memory block) that are accessed by threads. For example, the state memory may indicate that thread 18 attempted to access "Address A" of memory block 24 and that thread 20 attempted to access "Address C" of memory block 24 during the time that synchronization object 30 protected memory block 24 on behalf of thread 16, which has not accessed either "Address A" or "Address C" thus far during this run of CPUT. This scenario may represent a situation in which the memory block (or individual memory addresses within the memory block), may be tagged as unsuitable for protection by a synchronization object 30, as threads 18, 20 needlessly waited to access "Address A" and "Address C" (respectively), even though thread 16 did not access those addresses within memory block 24.

It should be appreciated that FIG. 1 is presented for illustrative purposes only and that the present disclosure is not intended to be restricted by the number of threads or memory blocks shown. That is, the CPUT may include a greater or lesser number of threads and/or a greater or lesser number of memory blocks. Further, although memory blocks are shown to illustrate particular aspects of the present disclosure, it should be appreciated that the arrangements disclosed herein may be applied to other resources that may be protected and/or regulated through the use of synchronization (e.g., individual memory addresses; peripheral devices; and any other resource that may require synchronized access). Accordingly, the present disclosure is not intended to be limited solely to the observation of memory block access.

Figure 2:
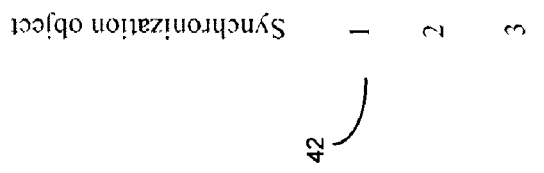
FIG. 2 is a diagrammatic view of state memory for use by the threading model analysis process of FIG. 1.

FIG. 2 is a pictorial diagram illustrating state memory 32 (as discussed above) in accordance with one embodiment of this disclosure. As discussed above, the size of state memory 32 may be dictated by one or more parameters, such as the product of the (# of synchronization objects)×(#of threads). FIG. 2 is illustrative of a simple state bit management scheme. In this illustration, state memory 32 may include a table having twelve state bits allocated per resource (e.g., per memory block). Such a configuration assumes that three synchronization objects and four threads exist at resource allocation time. It should be appreciated that greater or fewer synchronization objects and/or threads may be in existence and that, therefore, the number of state bits indicated herein is for illustrative purposes only and is not intended to be a limitation of this disclosure.

The state bits included within state memory 32 may represent information on a per synchronization object and per thread basis. For example, a "0" entry in table 42 may indicate that the resource has not been accessed by the indicated thread while the indicated synchronization object was engaged. A "1" entry in table 42 may indicate that the resource has been accessed by the indicated thread while the indicated synchronization object was engaged. Because resources may continue to be accessed while additional threads and synchronization objects are created, the state bit table 42 associated with each resource may be enlarged (via reallocation) to accommodate additional state bit requirements when a resource is accessed.

FIGS. 4-12 are a series of flow charts of sub-processes that may be included within thread model analysis process 10, each of which will be discussed below in greater detail. As noted, the various methods disclosed herein may be implemented using a runtime analysis tool 32 (as previously described). Further, the sub-processes may begin in a state where runtime analysis tool 32 has been started and is monitoring the CPUT, which is also being executed.

Threading Model Analysis Process

Figure 3:
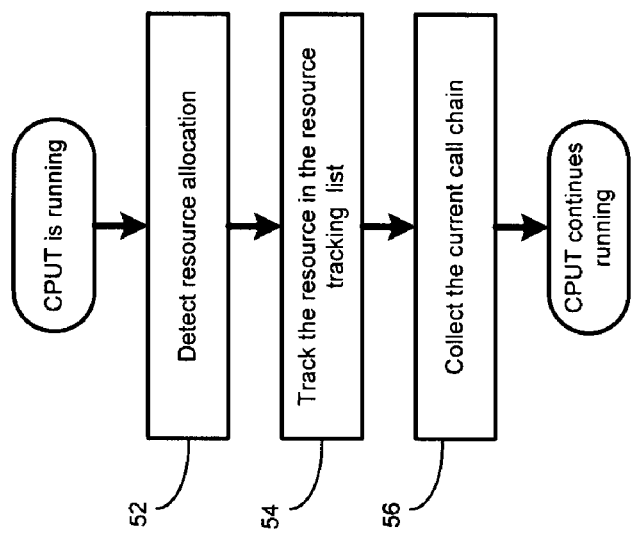
FIG. 3 is a flowchart of a portion of the threading model analysis process of FIG. 1.

Referring to FIG. 3, there is shown one embodiment of a process 50 for detecting resource allocation. As discussed above, a resource may include, but is not limited to, a memory block, an individual memory address; a peripheral device; and any other resource that may require synchronized access. Resources may be tracked via resource tracking lists, examples of which may include but are not limited to ordered linked lists and skiplists. A linked list is a data structure used in computer programming that defines a sequence of nodes, each of which may contain arbitrary data fields and one or two references (or links) pointing to the next and/or previous nodes. A skiplist is an augmentation of the above-described linked list. Skiplists may include forward links that allow for accelerated searching of the list by skipping parts of the list.

When a resource is allocated, a list entry may be created for the allocated resource and inserted into the above-described resource tracking list. Each list entry may serve as an anchor for (or root of) a call chain, or a state bit table. Accordingly, each list entry may serve as an anchor for a call chain that may be collected if the resource is later determined to be unsuitably protected by one or more synchronization objects. Further, each list entry may also anchor a state bit table that may be updated as the allocated resource is accessed (as discussed below in greater detail). For example, when a memory block is accessed by a thread that has caused another thread to wait, state bits within the state bit table may be allocated (if the first occurrence) or updated (if a subsequent occurrence) in indicate such access. A similar scheme may be applied for other resources (e.g., an individual memory addresses; peripheral devices; and any other resource that may require synchronized access).

Accordingly and as illustrated in FIG. 3, during execution of the CPUT, when process 50 detects 52 a resource allocation, process 50 may track 54 the resource in a resource tracking list (e.g., the above-described ordered link lists and skiplists) and may collect 56 the current call chain. A call chain is a list of the address(es) of the function(s) called up to the current point in the execution cycle of the CPUT. Accordingly, when collecting 56 the current call chain, process 50 may walk the call chain in a manner similar to a debugger updating its call stack display. Alternatively, the runtime analysis tool may record a thread stack list element at each function entry, including the starting address of the function, and remove that list element when the function exits. Thus, a call chain may be obtained (that includes only the instrumented functions of the CPUT) at any time by walking the recorded list.

Figure 4:
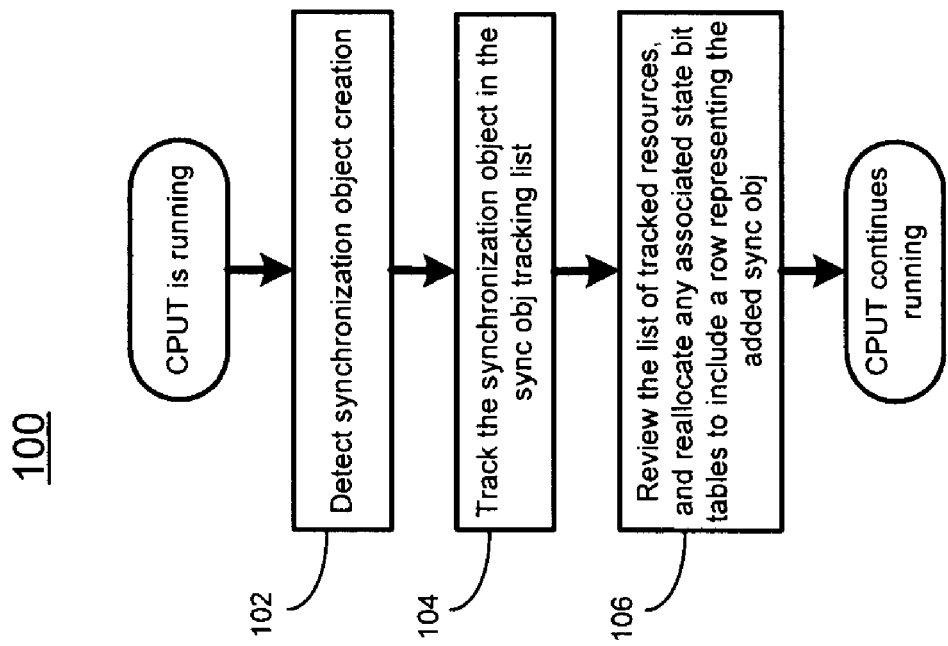
FIG. 4 is a flowchart of a portion of the threading model analysis process of FIG. 1.

Referring to FIG. 4, there is shown one embodiment of a process 100 for detecting synchronization object creation. When a synchronization object (e.g., a lock) is created, a list entry may be created for the synchronization object and placed within a synchronization object tracking list (e.g., an ordered link list or a skiplist). Each entry within the synchronization object tracking list may serve as an anchor for a call chain and a set of pointers to thread tracking structures. The pointers, initialized to NULL values, may be set whenever a thread is holding or waiting for the synchronization object and, therefore, may define the thread currently holding the lock and one or more threads that are currently waiting for the lock to be come available.

Interception of synchronization application programming interfaces (APIs) such as the InitializeCriticalSection( ), EnterCriticalSection( ), and LeaveCriticalSection( ) APIs available on computer systems running a Microsoft® Windows® variety of operating system, can be used to indicate the fact that a synchronization object exists, that a thread is attempting to engage that synchronization object, and that a thread is attempting to disengage the synchronization object, respectively.

Accordingly and as illustrated in FIG. 4, during execution of the CPUT, process 100 may detect 102 the creation of a synchronization object, examples of which may include but are not limited to a critical section. Process 100 may track 104 the synchronization object in the above-described synchronization object tracking list. Process 100 may review 106 the list of tracked resources and reallocate any associated state bit tables to include a row representing the added synchronization object. As discussed above and as shown in FIG. 2, state bit table 42 is shown to include three rows (i.e., "1", "2" and "3"), each of which corresponds to a synchronization object created during the execution of the CPUT. Accordingly, if a fourth synchronization object is created, the state bit table associated with each allocated resource (e.g., heap memory block) may be expanded to track the newly-created synchronization object.

Figure 5:
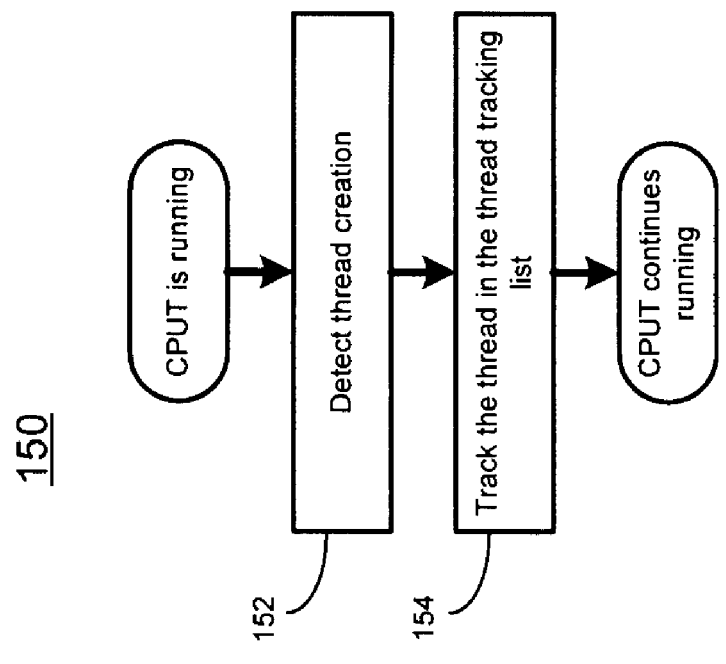
FIG. 5 is a flowchart of a portion of the threading model analysis process of FIG. 1.

Referring to FIG. 5, when a thread is created, a list entry may be created for the newly-created thread and inserted into a thread tracking list (e.g., an ordered linked list or a skiplist). Each list entry within the thread tracking list may serve as an anchor for a call chain and a record of whether the thread is waiting for a synchronization object. Accordingly, upon process 150 detecting 152 the creation of a thread during execution of the CPUT, process 150 may track 154 the thread in the above-described thread tracking list.

Thread creation can be intercepted via hooks of one form or another on most computer systems. On computer systems running a Microsoft® Windows® variety of operating system, the interception can occur via a DllMain( ) routine that is invoked with a dwReason parameter indicating a "thread attach" status. This routine can query the identifier (ID) of a thread and add the thread to the thread tracking list.

Figure 6:
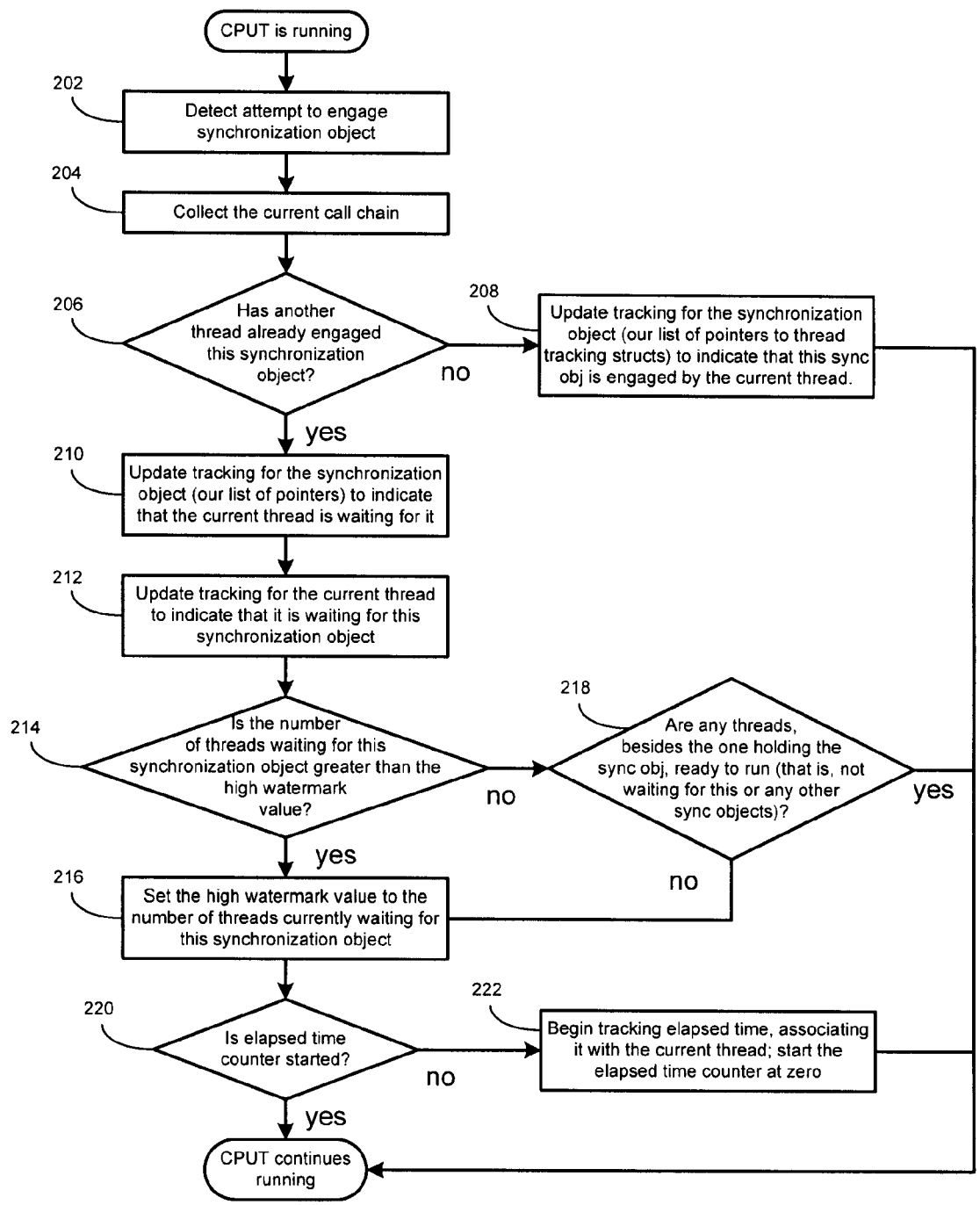
FIG. 6 is a flowchart of a portion of the threading model analysis process of FIG. 1.

Referring to FIG. 6, there is shown one embodiment of a process 200 for initializing a thread highwater mark. A global integer value may be tracked as the highwater mark, representing the largest number of threads (so far) that have been held up waiting to engage a currently-engaged synchronization object during the execution of CPUT. This integer value may be initialized to zero at the beginning of a run of the CPUT and increased as described below.

During execution of the CPUT, process 200 may detect 202 an attempt to engage a synchronization object. Once detected, the current call chain for the subject synchronization object may be collected 204. A determination 206 may be made concerning whether another thread has already engaged the subject synchronization object. If 206 another thread has not already engaged the subject synchronization object, the synchronization object tracking list for the subject synchronization object may be updated 208 to indicate that the subject synchronization object is engaged by the current thread.

Alternatively, if 206 another thread has already engaged the subject synchronization object, the synchronization object tracking list for the subject synchronization object may be updated 210 to indicate that the current thread is waiting to engage the subject synchronization object once the subject synchronization object becomes available (e.g., when the thread that is currently engaging the subject synchronization object disengages the subject synchronization object). Unfortunately, until the thread that is currently engaging the subject synchronization object disengages the subject synchronization object, the current thread is essentially in a holding pattern.

Further, the thread tracking list for the current thread (i.e., the thread waiting to access the subject synchronization object) may also be updated 212 to indicate that the current thread is waiting for the subject synchronization object to become available for engagement.

A determination 214 may be made concerning whether the number of threads waiting to access the subject synchronization object is greater than a high watermark value. As discussed above, this high watermark value may initially be set 216 to zero and may be set 216 to higher values during execution of the CPUT. For example, if ten threads are initially waiting to engage the subject synchronization object, process 200 may set 216 the highwater mark value to ten. Assuming that during further execution of the CPUT, one-hundred-thirty threads are waiting to engage the subject synchronization object, process 200 may set 216 the high watermark value to one-hundred-thirty. Further, assume that during further execution of the CPUT, eleven-hundred-forty threads are waiting to engage the subject synchronization object. Accordingly, process 200 may set 216 the high watermark value to eleven-hundred-forty.

However, if it is determined 214 that the number of threads waiting to engage the subject synchronization object does not exceed the highwater mark value, process 200 may determine 218 if any threads (besides the one currently engaging the synchronization object) are ready to run. Specifically, if no other threads are available to run, a deadlock condition may be occurring. A deadlock condition may occur when two threads are each waiting to engage synchronization objects and each thread holds (i.e., currently engages) a synchronization object that the other thread is waiting to engage. For example, if "Thread A" (which currently engages "Lock A") is waiting to engage "Lock B" and "Thread B" (which currently engages "Lock B") is waiting to engage "Thread A", then a deadlock condition is occurring. Typically, unless something is done to interrupt the state of the two threads (e.g., "Thread A" and "Thread B"), then both threads will wait indefinitely to execute.

If 218 there are no other threads ready to run, whether or not a deadlock condition may be occurring, the CPUT is clearly unable to perform parallel operations because of contention for one or more synchronization objects, and process 200 may set 216 the high-water mark equal to the number of threads that are currently waiting to engage the subject synchronization objects. If 218 other threads are ready to run, the CPUT may continue running.

Once the highwater mark is set 216, process 200 may determine if 220 an elapsed time counter has been set. If 220 an elapsed time counter has been set, the CPUT may continue running. If 220 an elapsed time counter has not been set, process 200 may start 222 an elapsed time counter. The elapsed time counter may track the amount of time that the current thread has been waiting for the synchronization object in question. Once the elapsed time counter has been started 222, the CPUT may continue running.

As the elapsed time counter is only started once, the elapsed time counter may reflect the longest amount of time that any thread has been waiting to engage the subject synchronization object while the highwater mark condition has been attained. For example, assume that "Thread A" had previously engaged the subject synchronization object. Subsequently, at time T=0.00 milliseconds, "Thread B" attempts to engage the subject synchronization object. At this point, the elapsed time counter may be started 222. Assume that at time T=1.00 millisecond, "Thread B" attempts to engage the subject synchronization object, and at time T=3.00 milliseconds (i.e., 2.00 milliseconds later), "Thread C" attempts to engage the subject synchronization object. At this point in time, the value of the elapsed time counter is 3.00 milliseconds (i.e., the longest amount of time since any thread (i.e., "Thread B") attempted to engage the subject synchronization object and was denied engagement.

Figure 7:
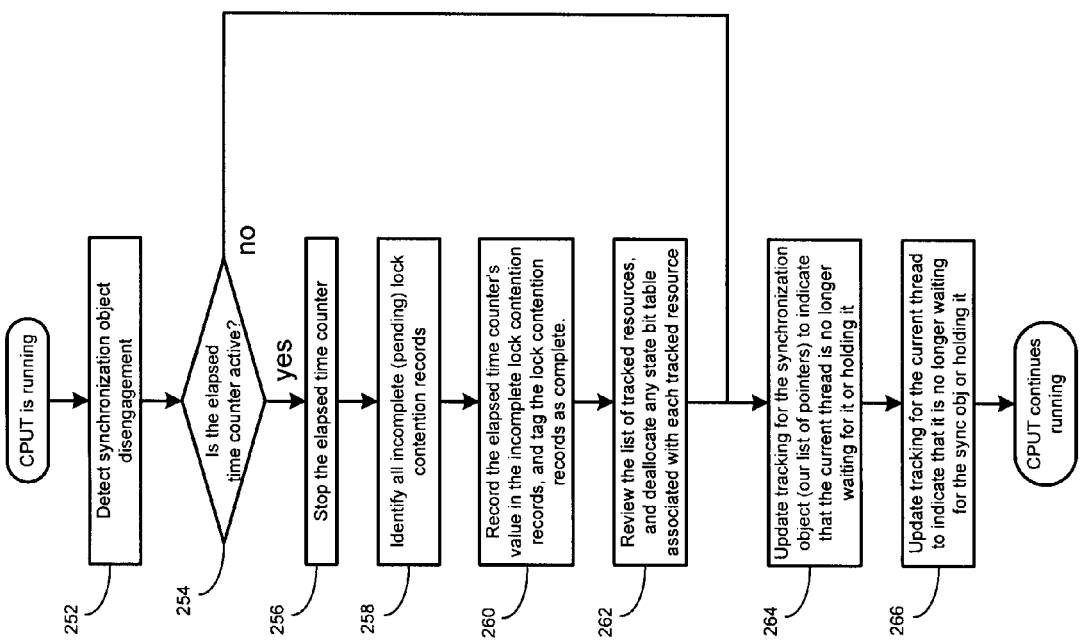
FIG. 7 is a flowchart of a portion of the threading model analysis process of FIG. 1.

Referring to FIG. 7, there is shown one embodiment of a process 250 for disengaging a synchronization object. Upon detecting 252 that the subject synchronization object is being disengaged 252 by e.g., "Thread A", process 250 may determine 254 if the elapsed time counter is active (i.e., which, as described above, indicates the occurrence of a high watermark condition). If 254 the elapsed time counter is active, process 250 may stop the elapsed time counter and identify 258 all incomplete (i.e., pending) lock contention records and record 260 the elapsed time (as defined by the elapsed time counter) in each of the incomplete (i.e., pending) lock contention records and define each lock contention record as complete. Examples of such incomplete (i.e., pending) lock contention records may include the above-described synchronization object tracking list updated 210 (FIG. 6) for the subject synchronization object and the above-described thread tracking list 212 (FIG. 6) updated for the current thread.

Process 250 may review the list of tracked resources and deallocate any state bit table associated with each tracked resource. This may occur when either a resource has been deallocated or when a highwater mark condition that has been obtained is no longer occurring. Each state bit table may be specific to a tracked resource. The state bits may be used only during the time when a highwater mark condition has been obtained, and they may be specific to the period of time during which a specific highwater mark condition has taken place.

Process 250 may update 264 the synchronization object tracking list to indicate that the current thread is no longer waiting for (i.e., if the current thread was waiting to engage) and/or the current thread is no longer holding (i.e., if the current thread was actually engaging) the subject synchronization object. Process 250 may further update 266 the thread tracking list to indicate that the current thread is no longer waiting for (i.e., if the current thread was waiting to engage)

and/or the current thread is no longer holding (i.e., if the current thread was actually engaging) the subject synchronization object.

Figure 8:
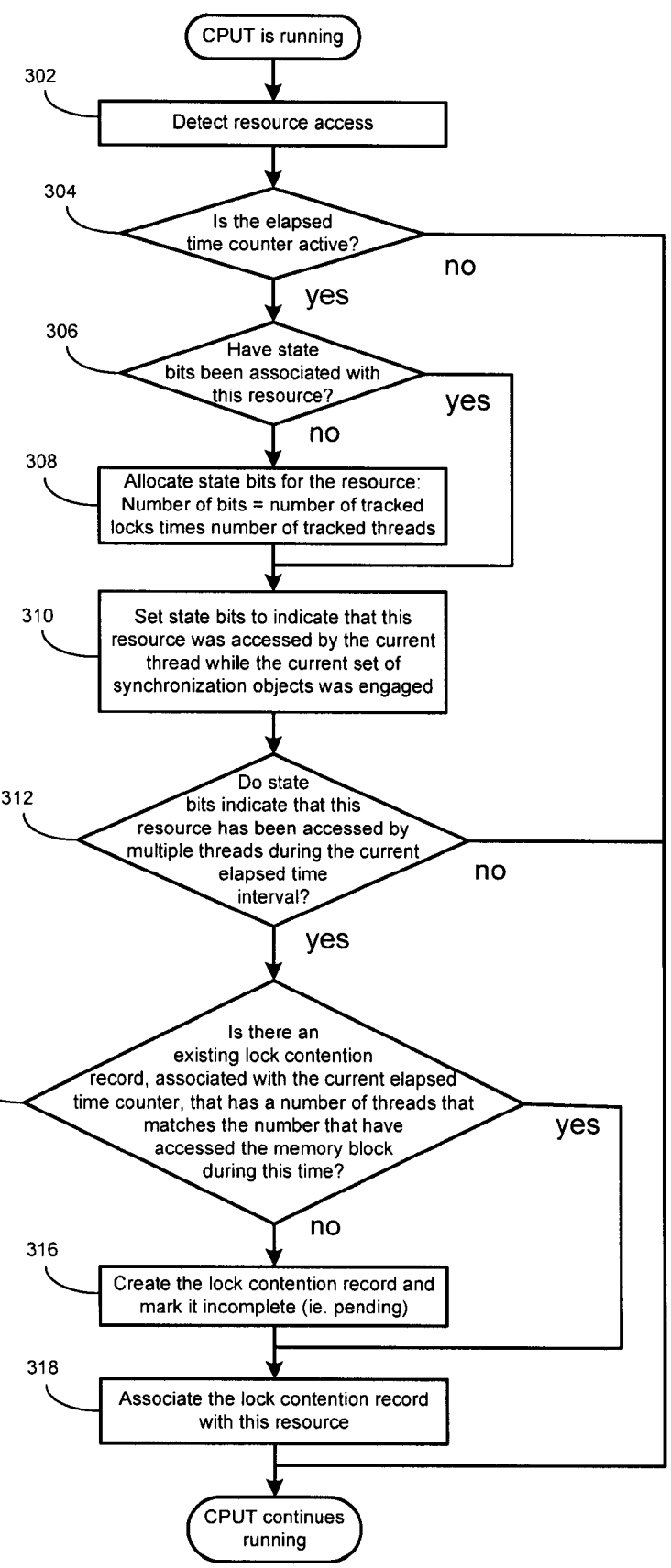
FIG. 8 is a flowchart of a portion of the threading model analysis process of FIG. 1.

Referring to FIG. 8, there is shown one embodiment of a process 300 for generating a lock contention record. A lock contention record may be created each time that the highwater mark level (as discussed above) is reached. Lock contention occurs whenever one thread (e.g., "Thread A") attempts to engage a lock held by another thread (e.g., "Thread B"). Typically, the more granular the available locks, the less likely it is that one thread will attempt to engage a lock held by another thread. For example, locking a row of a table (i.e., a higher level of granularity) rather than locking the entire table (i.e., a lower level of granularity), or locking a cell of a row of a table (i.e., a higher level of granularity) rather than the entire row of the table (i.e., a lower level of granularity).

As discussed above, the highwater mark represents the greatest level of thread contention so far encountered during execution of the CPUT. A set of resources may be associated with each lock contention record, wherein each of these resources may have been accessed while the level of lock contention was at the high watermark level. Additionally, allocation call chains may be displayed for the most contentious resources. That is, the call chains collected when those resources were allocated may be provided to the user of the runtime analysis tool as part of a displayed report regarding contention for synchronization objects.

Lock contention records may be tracked in a list that may be expanded only during times of high-water mark contention for synchronization objects. There may be multiple lock contention records for a given case of high contention associated with a particular elapsed time in which the high watermark condition is happening. The purpose of the multiple lock contention records is to provide a means to identify a set of resources that has been accessed by a particular number of threads during the elapsed time period of high contention for synchronization objects. There can be multiple resources associated with a given lock contention record; those would be the resources for which the number of accessing threads was the same during that elapsed time interval.

Each lock contention record may contain the following fields:

Elapsed_Time: The total amount of time during which the highwater mark level of lock contention took place, recorded in the lock contention record as soon as the number of waiting threads for the subject synchronization object is no longer at the highwater mark level.

Number_Of_Threads: The total number of threads that have attempted to engage the subject synchronization object. There may be a multiplicity of memory blocks or other resources that have matching Number_Of_Threads values and that may therefore share a lock contention record. The lock contention record may be associated with these resources via references to tracking elements for those resources in the resource tracking list. This list of references may require an additional field or fields in the lock contention record.

High_Water_Mark_Value: The current high watermark level representing the amount of thread contention associated with this lock contention record. This value may represents the number of threads waiting for the subject synchronization object.

Complete: A Boolean operator indicating whether or not the lock contention record can be updated.

Upon process 300 detecting 302 a resource being accessed, process 300 may determine 304 whether the elapsed time counter is active (i.e., which, as described above, indicates the occurrence of a high watermark condition). If 304 the elapsed time counter is active, process 300 may determine 306 whether state bits have been associated with the resource being accessed. If state bits have not been associated with the resource being accessed, process 300 may allocate 308 state bits for the resource being accessed. When allocating 308 state bits, as discussed above, the number of state bits allocated 308 for the resource by process 300 may be equal to the product of the number of tracked synchronization objects and the number of tracked threads.

Once state bits are allocated 308 (or if 306 state bits were previously associated with the resource being allocated), process 300 may set the state bits to indicate that the resource was accessed by the current thread while the current set of subject synchronization objects was engaged. The current set of engaged synchronization objects may be determined via traversal of the list of synchronization objects, checking each list element for the flag indicating that the synchronization object is engaged by a thread. The state bits corresponding to the subject resource, thread, and synchronization object may be set to record the current status of synchronization object engagement.

Process 300 may determine 312 if the state bits associated with the resource being accessed indicate that this resource has been accessed by multiple threads during the time interval defined by the elapsed time counter. If 312 the state bits do indicate that this resource was accessed by multiple threads, process 300 may determine 314 whether there is a lock contention record (associated with the current elapsed time counter) that has a number of threads that matches the number of threads that have accessed the memory block during the elapsed time.

If 314 there are no matching lock contention records, then process 300 may create 316 a lock contention record for the current elapsed time counter and mark it as incomplete. Once the lock contention record is created 316 (or if 314 there was a matching lock contention record), process 300 may associate 318 the lock contention record with the resource being accessed.

Figure 9:
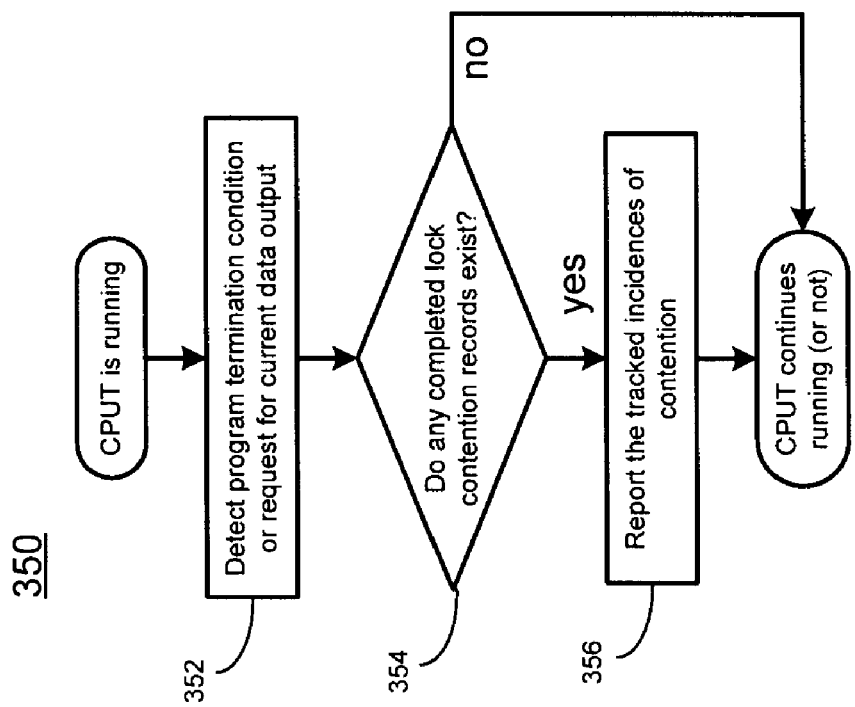
FIG. 9 is a flowchart of a portion of the threading model analysis process of FIG. 1.

Referring to FIG. 9, there is shown one embodiment of a process 350 for reporting incidences of lock contention. Process 350 may detect 352 a termination of the CPUT or a request for current lock contention data output from the CPUT. Process 350 may determine 354 if any completed lock contention records exist. If 354 one or more lock contention records exists, process 350 may report 356 the tracked incidences of lock contention to e.g., the software developer to aid in the optimization and improvement of the CPUT.

When reporting 356 incidences of lock contention, process 350 may sort the lock contention records according to e.g., (a) the High_Water_Mark_Value field, (b) the Elapsed_Time field, or a combination of both. Resources associated with the sorted lock contention records may be identified in e.g., a set of report lines, one line per resource. The lines within the report may be expandable to show allocation call chains for each resource. Reporting may be achieved by reviewing the list of resources and selecting resources associated with a particular lock contention record in the sorted set of lock contention records. If multiple resources match a lock contention record, they may be further sorted according to commonality among the allocation call chains associated with each resource. Multiple types of commonality matches might be applied. For example, if the outermost few levels of function calls were the same, for a set of resource allocations, then the resources have most likely been allocated by routines within a common software component. It may be useful to indicate which resources associated with that component are contending for a synchronization object, and this sort might assist to indicate this. On the other hand, a custom allocator may be associated with a synchronization object that is suspected to cause synchronization object contention, in which case sorting by commonality amount the innermost few levels of function calls can identify the situations where contention involving the custom allocator has actually occurred.

Figure 10:
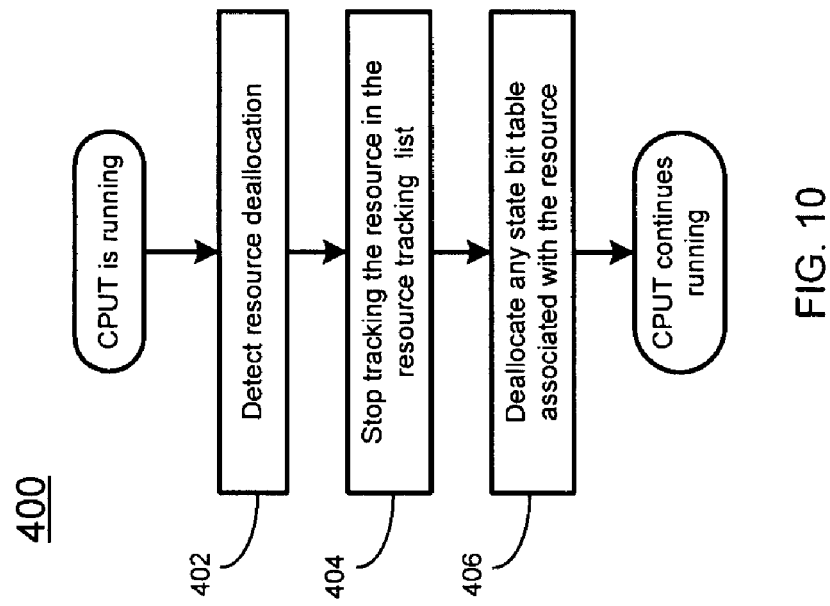
FIG. 10 is a flowchart of a portion of the threading model analysis process of FIG. 1.

Referring to FIG. 10, there is shown one embodiment of a process 400 for deallocating a resource. When process 400 detects 402 a resource deallocation, process 400 may stop 404 tracking the resource in the resource tracking list (described above) and deallocate 406 any state bit table (described above) associated with the deallocated resource.

Figure 11:
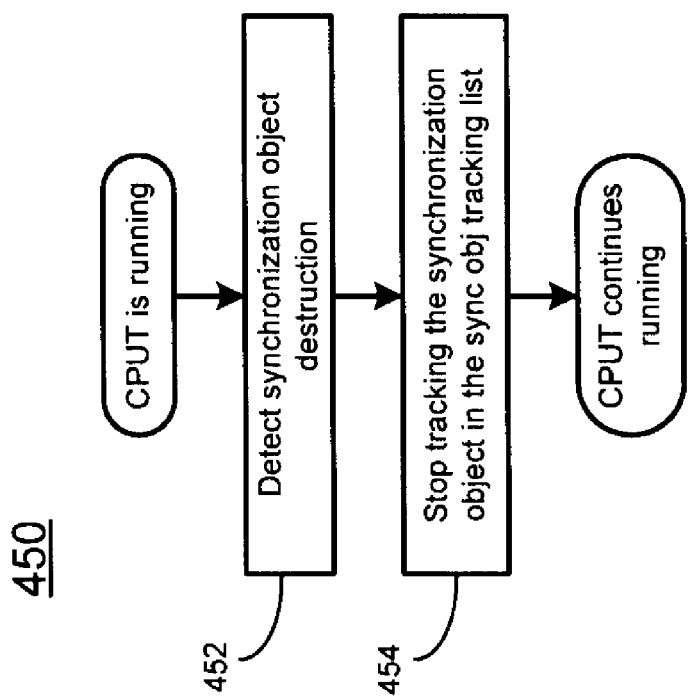
FIG. 11 is a flowchart of a portion of the threading model analysis process of FIG. 1.

Referring to FIG. 11, there is shown one embodiment of a process 450 for destroying a synchronization object. When process 450 detects 452 synchronization object destruction, process 450 may stop tracking 454 the synchronization object in the synchronization object tracking list (described above).

Figure 12:
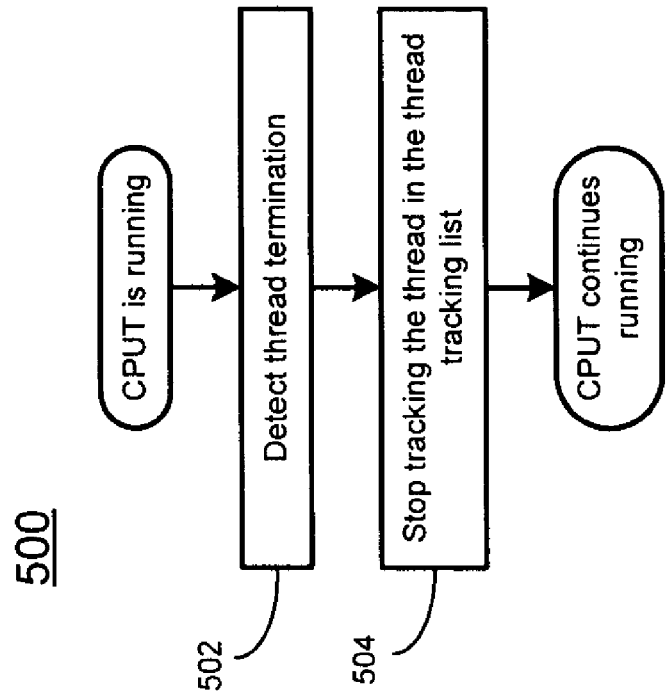
FIG. 12 is a flowchart of a portion of the threading model analysis process of FIG. 1.

Referring to FIG. 12, there is shown one embodiment of a process 500 for terminating a thread. Upon process 500 detecting 502 thread termination, process 500 may stop tracking 504 the thread in the thread tracking list.

Process 10 may provide an objective measurement of threading model improvement. Process 10 may render a color-coded chart of thread activity over time that may show a developer how much lock contention occurs during the run. These color-coded charts may be compared from run to run. For example, a bar may be shown for each thread, lengthening as time goes by during the run, with new segments appearing for each given unit of time and perhaps color-coded as follows: green=executing on a processor; blue=available to execute; red=waiting for a lock; and yellow=waiting for some other reason.

For example, suppose a developer has an idea of how to improve a program's threading model to make it more MP-exploitive. The developer may run process 10 both before and after making the threading model changes, to assess the results. The comparison of the runs, as shown by process 10, may depict the effect of code changes and reveal any remaining conditions of lock contention. This may be more reliably informative to the developer than the guesswork associated with running the "before" and "after" versions of the program on a bunch of systems having various numbers of processors trying to quantify performance differences experimentally A number of implementations have been described. Nevertheless, it will be understood that various modifications may be made. Accordingly, other implementations are within the scope of the following claims.

What is claimed is:

1. A threading model analysis method comprising:
   detecting, via one or more computing devices, an attempt by a first thread to engage a synchronization object;
   determining, via the one or more computing devices, if an earlier thread has already engaged the synchronization object;
   in response to determining that the earlier thread has already engaged the synchronization object, determining, via the one or more computing devices, if the number of threads waiting to engage the synchronization object is greater than a highwater mark;
   in response to determining that the number of threads waiting to engage the synchronization object is not greater than the highwater mark, determining if any thread, other than the earlier thread, is ready to run; and
   in response to determining that no thread, other than the earlier thread, is ready to run, setting the highwater mark equal to the number of threads waiting to engage the synchronization object.

2. The method of claim 1 further comprising:
   in response to determining that the number of threads waiting to engage the synchronization object is greater than the highwater mark, setting the highwater mark equal to the number of threads waiting to engage the synchronization object.

3. The method of claim 2 wherein the number of threads waiting to engage the synchronization object includes only the first thread, the method further comprising:
   in response to setting the highwater mark equal to the number of threads waiting to engage the synchronization object, starting an elapsed time counter indicative of the amount of time that the first thread has been waiting to engage the synchronization object.

4. The method of claim 1 wherein the highwater mark has an initial value of zero and is incremented to match the number of threads waiting to engage the synchronization object.

5. The method of claim 1 further comprising:
   detecting disengagement of the synchronization object.

6. The method of claim 5 further comprising:
   identifying one or more lock contention records associated with the disengaged synchronization object.

7. The method of claim 6 further comprising:
   updating the one or more lock contention records to reflect the disengagement of the synchronization object.

8. The method of claim 5 further comprising:
   detecting a program termination condition and/or a data request;
   determining if one or more lock contention records exists; and
   reporting at least one of the one or more lock contention records sorted by one or more of elapsed time, level of synchronization object contention, and commonality among the resource allocation scenarios.

9. A computer program product comprising a non-transitory computer readable medium including a computer readable program, wherein the computer readable program when executed on a computer causes the computer to:
   detect an attempt by a first thread to engage a synchronization object;
   determine if an earlier thread has already engaged the synchronization object;
   in response to determining that the earlier thread has already engaged the synchronization object, determine if the number of threads waiting to engage the synchronization object is greater than a highwater mark;
   in response to determining that the number of threads waiting to engage the synchronization object is not greater than the highwater mark, determine if any thread, other than the earlier thread, is ready to run; and
   in response to determining that no thread, other than the earlier thread, is ready to run, set the highwater mark equal to the number of threads waiting to engage the synchronization object.

10. The computer program product of claim 9 further comprising instructions for:
    in response to determining that the number of threads waiting to engage the synchronization object is greater than the highwater mark, setting the highwater mark equal to the number of threads waiting to engage the synchronization object.

11. The computer program product of claim 10 wherein the number of threads waiting to engage the synchronization object includes only the first thread, the computer program product further comprising instructions for:

in response to setting the highwater mark equal to the number of threads waiting to engage the synchronization object, starting an elapsed time counter indicative of the amount of time that the first thread has been waiting to engage the synchronization object.

12. The computer program product of claim 9 wherein the highwater mark has an initial value of zero and is incremented to match the number of threads waiting to engage the synchronization object.

13. The computer program product of claim 9 further comprising instructions for:

detecting disengagement of the synchronization object.

14. The computer program product of claim 13 further comprising instructions for:

identifying one or more lock contention records associated with the disengaged synchronization object.

15. The computer program product of claim 14 further comprising instructions for:

updating the one or more lock contention records to reflect the disengagement of the synchronization object.

16. The computer program product of claim 13 further comprising instructions for:

detecting a program termination condition and/or a data request;

determining if one or more lock contention records exists; and reporting at least one of the one or more lock contention records sorted by one or more of elapsed time, level of synchronization object contention, and commonality among the resource allocation scenarios.

* * * * *